United States Patent
Park et al.

(10) Patent No.: US 8,689,741 B2
(45) Date of Patent: Apr. 8, 2014

(54) THERMAL MANAGEMENT SYSTEM, VEHICLES EMBODYING SAME AND METHODS RELATED THERETO

(75) Inventors: Hee Sang Park, Gyeonggi-do (KR); Ho Seok Jeon, Incheon (KR); Hyun Kim, Gyeonggi-do (KR); June Kyu Park, Gyeonggi-do (KR); Jung Hwan Yun, Seoul (KR); Jun Mo Ku, Gyeonggi-do (KR); Sang Ha Kim, Gyeonggi-do (KR)

(73) Assignees: Hyundai Motor Corporation, Seoul (KR); Kia Motors Corporation, Seoul (KR)

( * ) Notice: Subject to any disclaimer, the term of this patent is extended or adjusted under 35 U.S.C. 154(b) by 524 days.

(21) Appl. No.: 12/941,376

(22) Filed: Nov. 8, 2010

(65) Prior Publication Data

US 2012/0048504 A1 Mar. 1, 2012

(30) Foreign Application Priority Data

Aug. 26, 2010 (KR) ........................ 10-2010-0083124

(51) Int. Cl.
  *F01P 7/02* (2006.01)
(52) U.S. Cl.
  USPC ................... 123/41.05; 123/41.31; 123/41.33
(58) Field of Classification Search
  USPC ...... 123/41.05, 142.5 E; 237/12.3 B; 165/202
  See application file for complete search history.

(56) References Cited

U.S. PATENT DOCUMENTS

| | | | |
|---|---|---|---|
| 6,575,258 B1 * | 6/2003 | Clemmer | 180/68.5 |
| 6,607,142 B1 * | 8/2003 | Boggs et al. | 237/12.3 B |
| 6,732,942 B1 * | 5/2004 | Sangwan et al. | 237/12.3 B |
| 7,520,320 B2 * | 4/2009 | Itoh et al. | 165/202 |
| 2003/0127528 A1 * | 7/2003 | Sabhapathy et al. | 237/12.3 B |
| 2008/0295535 A1 * | 12/2008 | Robinet et al. | 62/259.2 |
| 2009/0249807 A1 * | 10/2009 | Nemesh et al. | 62/117 |

FOREIGN PATENT DOCUMENTS

| | | | |
|---|---|---|---|
| FR | 2908458 A1 * | 5/2008 | |
| JP | 2001263061 A | 9/2001 | |
| JP | 2002276362 A | 9/2002 | |
| JP | 2002276364 A | 9/2002 | |
| JP | 2008290636 A | 12/2008 | |
| KR | 10-2008-0032729 | 4/2008 | |

* cited by examiner

*Primary Examiner* — Lindsay Low
*Assistant Examiner* — Omar Morales
(74) *Attorney, Agent, or Firm* — Edwards Wildman Palmer LLP; Peter F. Corless (57) ABSTRACT

The present invention features a thermal management system for a hybrid electric vehicle. Such a system includes a heater core supplies heat for heating the vehicle's interior by heat exchange between a coolant and air of the vehicle's interior, a coolant line fluidly coupling an engine and heater core so the coolant being circulated by a coolant pump passes there through. A bypass valve is located in the coolant line in proximity to the engine and is selectively opened and closed according to the on/off state of the engine and so that the coolant does not pass through the engine but passes through only the heater core in the engine off state. Such a system includes a heat exchanger fluidly coupled to another heat source so the coolant is heated by the heat exchanger and supplied to the heater core when in the off state.

18 Claims, 3 Drawing Sheets

THERMAL MANAGEMENT SYSTEM, VEHICLES EMBODYING SAME AND METHODS RELATED THERETO

CROSS-REFERENCE TO RELATED APPLICATION

This application claims under 35 U.S.C. §119(a) priority to and the benefit of Korean Patent Application No. 10-2010-0083124 filed Aug. 26, 2010, the entire contents of which are incorporated herein by reference.

BACKGROUND

1. Technical Field

The present invention generally relates to a thermal management system, a vehicle embodying such a thermal management system, and methods related thereto. More particularly, the present invention relates to a thermal management system that controls the flow of engine coolant during stoppage of an engine so as to improve the heating performance during engine stop when the interior of the vehicle is heated using an engine coolant. a hybrid electric vehicle having such a system and methods related thereto.

2. Background Art

Internal combustion engines as they are powered by fossil fuels such as gasoline or diesel have many shortcomings such as environmental contamination due to exhaust gas, global warming due to carbon dioxide, respiratory ailments due to increased ozone, etc. Moreover, because the amount of fossil fuels left on earth is limited, they will become exhausted some time in the future Consequently, various types of electric vehicles have been developed, including but not limited to a pure electric vehicle (EV) driven by operating a drive motor, a hybrid electric vehicle (HEV) driven by an engine and a drive motor, a fuel cell electric vehicle (FCEV) driven by operating a drive motor using electric power generated by a fuel cell.

These electric vehicles are low emission. environmentally-friendly vehicles or zero emission environmentally-friendly vehicles, which can minimize or completely solve the environmental problem and the resource depletion problem. The electric vehicle is equipped with an electric motor for driving the vehicle, a battery (e.g., high-voltage battery) as an energy storage device for supplying electric power to the electric motor, and an inverter for rotating the electric motor. The inverter inverts the phase of electric power supplied from the energy storage device (or fuel cell) based on a control signal applied from a controller to operate the electric motor.

Such an electric vehicle is equipped with converters for power conversion such as a low-voltage DC-DC converter (LDC) for power conversion between a high-voltage battery (i.e., main battery) and a low-voltage battery (i.e., auxiliary battery) and a high-voltage DC-DC converter (HDC) for converting the electric power of the high-voltage battery and supplying the converted power to high-voltage driving circuits.

In addition such an electric vehicle is equipped with a cooling system to extract heat generated from various components such as high-voltage components, thereby cooling such components. such an electric vehicle is equipped with an air conditioning and heating system that are configured an operated to improve the pleasantness of the interior of the vehicle, like what is done for the vehicles with internal combustion engines.

More particularly, the various power electronic components such as motors (e.g., drive motor, radiator fan motor, etc.), DC-DC converters, inverters, high-voltage batteries, etc. for such an electric vehicle are equipped with a water-cooling system including a pipe through which a coolant is supplied and circulated to absorb heat generated from the corresponding component.

Figure 1:
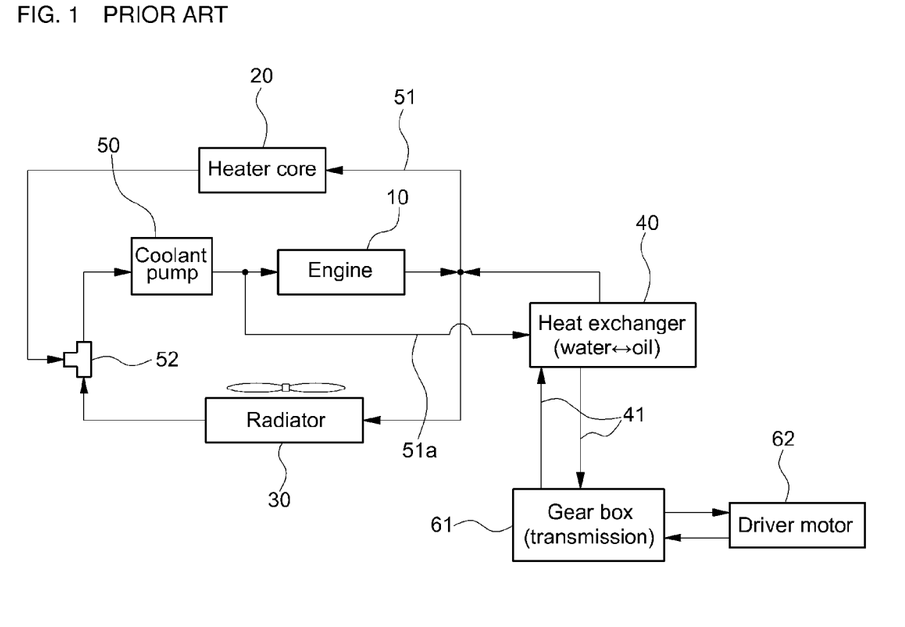
FIG. 1 is a schematic diagram of a configuration of a typical thermal management system for a hybrid electric vehicle.

Referring now to FIG. 1, there is shown a schematic diagram of a configuration of a typical thermal management system for a hybrid electric vehicle. Such a thermal management system includes an engine cooling system, a heating system that uses engine coolant, and a transmission oil cooling-heating system.

Such a hybrid electric vehicle includes an internal combustion engine, i.e., an engine 10 as a drive source and an engine cooling system that cools the engine 10 by supplying and circulating coolant. Such a hybrid vehicle also includes a heating system that heats the interior of the vehicle using the coolant of the engine 10, and a transmission oil cooling-heating system that cools or heats the oil of a gear box 61 having a transmission also using the coolant of the engine 10.

Such a cooling system includes a heater core 20, through which the coolant flows, which heater core is configured an arranged to extract or absorb heat energy from the coolant. The heat energy extracted or absorbed by the heater core 20 is exchanged or transferred to the air to be supplied to the vehicle interior. Typically, a fan or the like is fluidly coupled to the heater core 20 and the vehicle interior so that the heated air is circulated in the interior of the vehicle. In this way, heat is supplied to the interior of the vehicle.

In addition to including the engine 10 as a driving source and a heat source (e.g., water jacket of the engine block) and the heater core 20, such a hybrid electric vehicle also includes a radiator 30, a heat exchanger 40, gear box 61 and electric motor 62 (e.g., a drive motor). The radiator is provided to radiate the heat of the engine 10 through the heat exchange between the coolant passing through the engine 10 and the outside air. The heat exchanger 40 exchanges heat between the working oil of the gear box 61 and the coolant and is performed to heat or cool the gear box 61 (such as a transmission) connected to an electric motor 62 (e.g., drive motor).

Such a hybrid vehicle also includes a coolant line 51 that is connected between the engine 10, the heater core 20, the heat exchanger 40, and the radiator 30 such that the coolant is circulated there through. Also included is a coolant pump 50 that circulates the coolant through the coolant line 51, a thermostat 52 that controls the flow of the coolant so as to selectively pass through the radiator 30, and an oil line 41 that is connected between the heat exchanger 40 and the gear box 61 for oil circulation.

In this configuration of the thermal management system, when the engine 10 is being operated (e.g., vehicle being driven) the coolant absorbs the heat of the engine 10 and this heat is heat-exchanged with the air to be supplied to the interior of the vehicle in the heater core 20, thereby heating the interior of the vehicle.

When the engine 10 is stopped, the coolant absorbs heat from the oil which cools the gear box 61 in the heat exchanger 40 and is heat-exchanged with the air in the heater core 20, thereby supplying heat required to heat the interior of the vehicle.

When it is necessary to rapidly increase the temperature of the engine 10 so as to reduce exhaust gas and improve fuel efficiency after turning off the engine 10, it is possible to heat the engine using the heat from the oil of the heat exchanger 40 and absorbed by the coolant.

Restart

In the above-described system, however, if the engine is stopped and if the interior of the vehicle is heated using the latent heat of the engine 10 or using the heat transferred from the heat exchanger 40 to the coolant or if the temperature of the engine 10 is below the critical point, it is inevitably necessary to start the engine 10 for the heating of the interior of the vehicle.

While the coolant absorbs heat from the oil of the heat exchanger 40 and the interior of the vehicle is heated in a state, when the engine 10 is turned off the coolant passes through the engine at all times. This allows heat to be removed from the coolant by the cold engine 10, and as a result the heat for heating the interior of the vehicle is insufficient.

The above information disclosed in this Background section is only for enhancement of understanding of the background of the invention and therefore it may contain information that does not form the prior art that is already known in this country to a person of ordinary skill in the art.

It thus would be desirable to provide a new thermal management system, particularly for a hybrid electric vehicle, and methods related thereto. It would be particularly desirable to provide such a system and method that would improve the heating performance of the interior of a vehicle when it being heated using engine coolant and the engine is off as compared to prior art systems. Such thermal management systems preferably would be no more complicated than prior art systems and such methods would not increase the skill required for operators of such vehicles.

SUMMARY OF THE DISCLOSURE

The present invention features a thermal management system, a hybrid electric vehicle embodying such a thermal management system, methods for managing thermal systems of such a hybrid electric vehicle as well as methods related thereto. Such a thermal management systems and related methods advantageously further improve the heating performance during an engine stop when the interior of the vehicle is being heated using an engine coolant.

Such a thermal management system generally includes a heater core that supplies heat for heating the vehicle's interior by heat exchange between a coolant and air of the vehicle's interior, a coolant line fluidly coupling an engine and heater core so the coolant being circulated by a coolant pump passes there through. A bypass valve is located in the coolant line in proximity to the engine and is selectively opened and closed according to the on/off state of the engine and so that the coolant does not pass through the engine but passes through only the heater core in the engine off state. Such a system includes a heat exchanger fluidly coupled to another heat source so the coolant is heated by the heat exchanger and supplied to the heater core when in the off state.

According to an aspect, the present invention provides a thermal management system for a hybrid electric vehicle having an engine and that includes a heater core, a heat exchanger, a coolant line, a coolant pump, a heat exchanger medium line, a bypass line and a controller. The heater core supplies heat required to heat the interior of the vehicle by heat exchange between a coolant passing through an engine and air to be supplied to the interior of the vehicle. The heat exchanger is arranged such that heat exchange is performed between a heat exchange medium passing through a drive component and the coolant. The coolant line allows the coolant to pass through the engine, the heater core, and the heat exchanger. The coolant pump is installed in the coolant line. The heat exchange medium line allows the heat exchange medium to be circulated through the heat exchanger and the drive component.

The bypass valve is installed in the coolant line in proximity to the engine so as to be selectively opened and closed by the controller according to the on/off state of the engine. More particularly, the bypass valve is controlled by the controller such that the coolant does not pass through the engine but passes through only the heat exchanger when the engine is stopped and so the coolant heated by the heat exchanger is supplied to the heater core to heat the interior of the vehicle. As the coolant is prevented from passing through the stopped engine, the coolant is not cooled by the stopped engine.

According to yet another aspect of the present invention, there is featured another thermal management system for a vehicle, such as a hybrid electric vehicle. Such a thermal management system includes a heater core that supplies heat for heating the interior of a vehicle by heat exchange between a coolant passing through an engine and air to be supplied to the interior of the vehicle; a coolant line fluidly coupled to the engine and the heater core so that the coolant passes there through and a coolant pump located in the coolant line to circulate the coolant. Such a system also includes a bypass valve located in the coolant line in proximity to the engine and a controller operably coupled to the bypass valve. The controller is configured so as to selectively open and close the bypass valve according to the on/off state of the engine, where the controller controls the bypass valve such that the coolant does not pass through the engine but passes through only the heater core when the engine is stopped or in the off state. In this way, the coolant is thus prevented from being cooled by the engine.

In particular embodiments, such a thermal management system further includes a heat exchanger that is fluidly coupled to a heat source of the vehicle so that heat is exchanged by a heat exchange medium passing there between and the coolant line is fluidly coupled to the engine, the heater core, and the heat exchanger so that coolant passes there through. In such an arrangement, the bypass valve is controlled such that the coolant does not pass through the engine when it is stopped or in the off state, but rather the coolant passes through the heat exchanger so the coolant is heated by the heat exchanger and supplied to the heater core to heat the interior of the vehicle.

In yet further embodiments, the heat exchanger is an automatic transmission oil warmer in which heat exchange between an automatic transmission oil as a heat exchange medium and the coolant is performed or the heat exchanger is an exhaust heat recovery device in which heat exchange between exhaust gas discharged from the engine, the coolant, and the oil as the heat exchange medium is performed.

According to other aspects of the present invention, there is featured a hybrid electric vehicle including a reciprocating engine, a drive component selectively operably coupled to the engine and a thermal management system that controls at least heating of an interior of the vehicle as described herein.

In particular embodiments, such a hybrid electric vehicle includes an electric motor or motor generator that is operably coupled to the driver component.

According to yet another aspect of the present invention there is featured a thermal management method for a thermal management system for hybrid vehicle. Such a thermal management system includes a heater core for supplying heat required to heat the interior of the vehicle by heat exchange between a coolant passing through an engine and air to be supplied to the interior of the vehicle, a heat exchanger in which heat exchange between a heat exchange medium passing through a drive component and the coolant is performed, a coolant line for allowing the coolant to pass through the engine, the heater core, and the heat exchanger, a coolant pump installed in the coolant line, a heat exchange medium line for allowing the heat exchange medium to be circulated through the heat exchanger and the drive component, and a bypass valve installed in the coolant line at the engine to be opened and closed by a controller such that the coolant selectively passes through the engine Such a thermal management method includes the step(s) of controlling the bypass valve so that the coolant does not pass through the engine but passes through only the heat exchanger when the engine is stopped. In this way, the coolant is heated by the heat exchanger and is supplied to the heater core to heat the interior of the vehicle. As the coolant is prevented from passing through the stopped engine, the coolant is not cooled by the stopped engine.

According to yet another aspect of the present invention there is featured another thermal management method for a vehicle, such as a hybrid electric vehicle. Such a thermal management method includes providing a thermal management system including a heater core that supplies heat for heating the interior of a vehicle by heat exchange between a coolant passing through an engine and air to be supplied to the interior of the vehicle, a coolant line fluidly coupled to the engine and the heater core so that the coolant passes there through, a coolant pump installed in the coolant line to circulate the coolant, and a bypass valve installed in the coolant line in proximity to the engine. Such a method also includes controlling the bypass valve so that the coolant does not pass through the engine when the engine is in the off state and so that the coolant passes through at least only the heater core and thus the coolant is prevented from being cooled by the engine.

In more particular embodiments of such a thermal management method the provided thermal management system further includes a heat exchanger that is fluidly coupled to a heat source of the vehicle so that heat is exchanged by a heat exchange medium passing there between, where the coolant line is fluidly coupled to the engine, the heater core, and the heat exchanger so that coolant passes there through. Also in such a method the controlling of the bypass valve includes controlling the bypass valve such that the coolant does not pass through the engine when it is stopped, and such that the coolant passes through the heat exchanger and the heater core so the coolant is heated by the heat exchanger and supplied to the heater core to heat the interior of the vehicle.

Other aspects and preferred embodiments of the invention are discussed infra.

DEFINITIONS

The instant invention is most clearly understood with reference to the following definitions:

As used in the specification and claims, the singular form "a", "an" and "the" include plural references unless the context clearly dictates otherwise.

As used herein, the term "comprising" or "including" is intended to mean that the compositions, methods, devices, apparatuses and systems include the recited elements, but do not exclude other elements. "Consisting essentially of", when used to define compositions, devices, apparatuses, systems, and methods, shall mean excluding other elements of any essential significance to the combination. Embodiments defined by each of these transition terms are within the scope of this invention.

USP shall be understood to mean U.S. patent Number, namely a U.S. patent granted by the U.S. Patent and Trademark Office.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

It should be understood that the drawings are not to scale and present a somewhat simplified representation of various features illustrative of the present invention. As is known to those skilled in the art, the specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In the following detailed description, certain aspects and/or embodiments of the present invention are shown and described, by way of illustration. As those skilled in the art would realize, the described embodiments can be modified in various different ways, all without departing from the spirit or scope of the present invention. The drawings and description are to be regarded as illustrative in nature and not restrictive, and like reference numerals designate like elements throughout the specification.

According to aspects/embodiments, there is featured a thermal management system for a vehicle, such as a hybrid electric vehicle, an engine. Such a thermal management system includes a heater core that supplies heat for heating the interior of a vehicle by heat exchange between a coolant passing through the engine and air to be supplied to the interior of the vehicle; a coolant line fluidly coupled to the engine and the heater core so that the coolant passes there through and a coolant pump installed in the coolant line to circulate the coolant. Such a system also includes a bypass valve installed in the coolant line in proximity to the engine and a controller that is operably coupled to the bypass valve. Such a controller is configured so as to selectively open and close the bypass valve according to the on/off state of the engine, where the controller controls the bypass valve such that the coolant does not pass through the engine when it is in the off state but so as to pass through only the heater core.

In further aspects/embodiments, such a thermal management system further includes a heat exchanger that is fluidly coupled to another heat source of the vehicle so that heat is exchanged by a heat exchange medium passing there between. In such a configuration, the coolant line is fluidly coupled to the engine, the heater core, and the heat exchanger so that coolant passes there through and the bypass valve is controlled such that the coolant does not pass through the engine when it is stopped or in the off state, but rather the coolant passes through the heat exchanger so the coolant is heated by the heat exchanger and supplied to the heater core to heat the interior of the vehicle.

According to other aspects of the present invention there also is featured a hybrid electric vehicle that includes a reciprocating or internal combustion engine; a drive component selectively operably coupled to the engine; and a thermal management system that controls at least heating of an interior of the vehicle. Such a thermal management system is as described above or elsewhere herein.

Figure 2A:
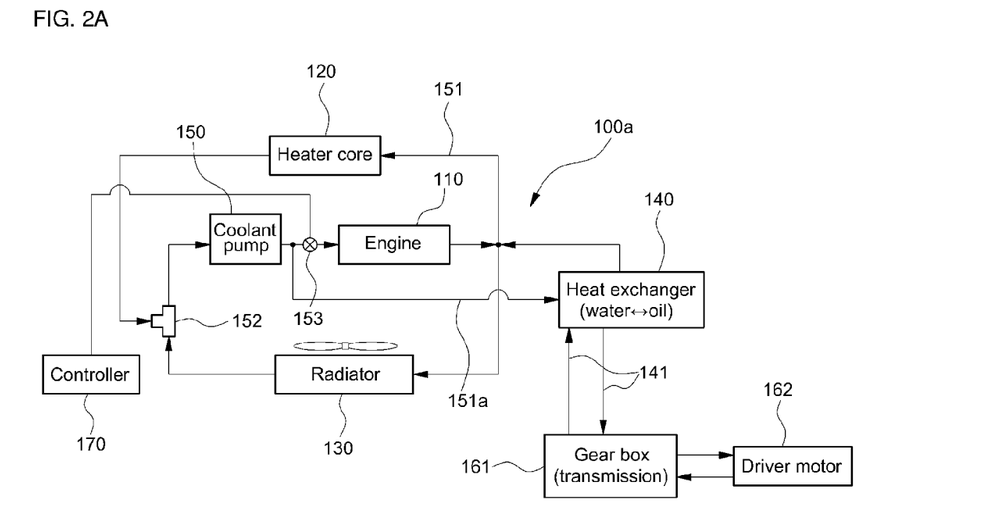
FIGS. 2A and 2B are schematic diagrams of embodiments of a thermal management system according to the present invention.
Figure 2B:
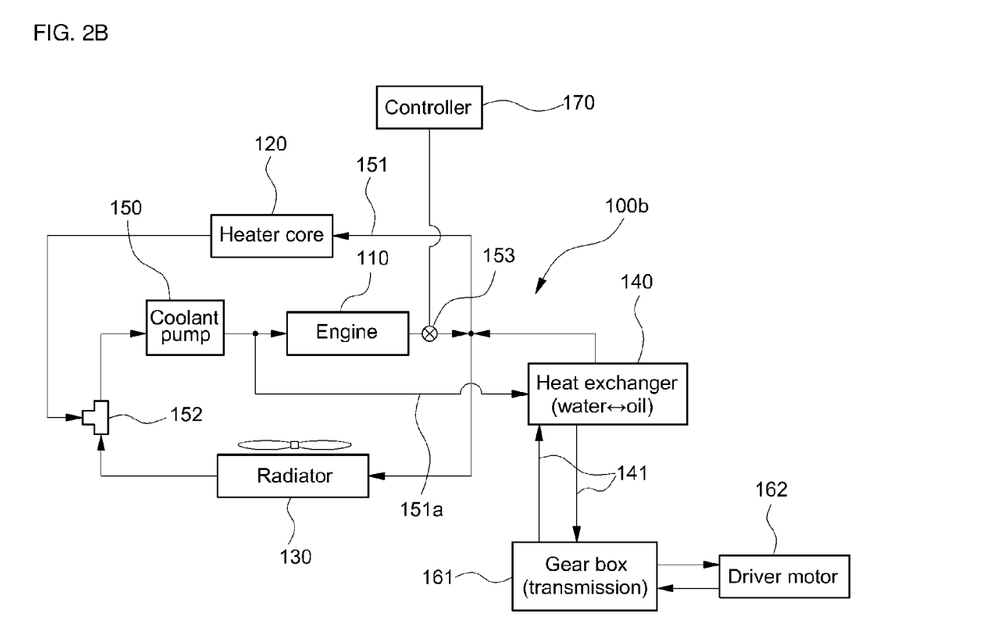
Figure 3:
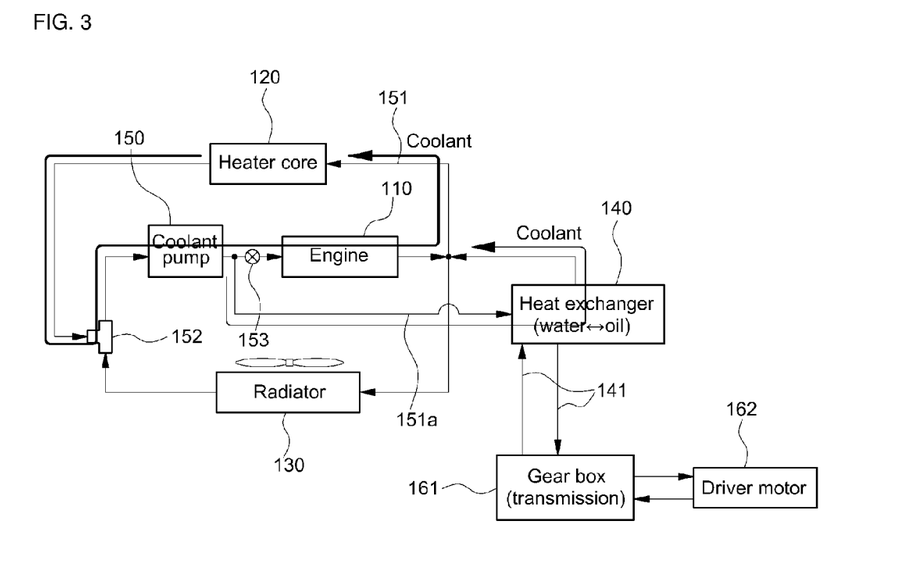
FIGS. 3 and 4 are schematic diagrams illustrating operation of the thermal management system according to the present invention, when the valve is open (FIG. 3) and when the valve is closed (FIG. 4).
Figure 4:
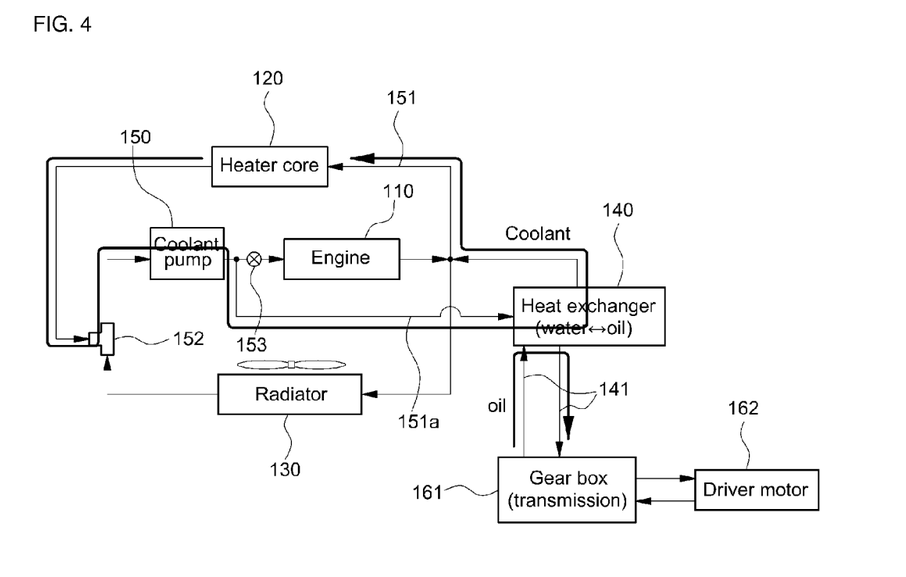

Referring now to FIGS. 2A and 2B there are shown schematic diagrams of a thermal management system 100 a,b for a vehicle, such as a hybrid electric vehicle, in accordance with the present invention when the bypass valve 153 is located in that portion of the coolant line 151 proximal the engine inlet (FIG. 2A) or when the bypass valve 153 is located in that portion of the coolant line 151 proximal the engine outlet (FIG. 2B). There is shown in FIGS. 3 and 4 schematic diagrams with flow paths overlaid so as to illustrate operation of the thermal management system for a hybrid electric vehicle in accordance with the present invention according to valve control, when the bypass valve 153 is open (FIG. 3) corresponding to an on state of the engine 110 and when the bypass valve is closed (FIG. 4) corresponding to an off state of the engine.

As shown in FIGS. 2A and 2B, the hybrid vehicle or hybrid electric vehicle includes an internal combustion engine or an engine 110 that functions as a drive source as well as a heat source. Such a vehicle also includes an engine cooling system for cooling the engine 110 by supplying and circulating a coolant or engine coolant, and a heating system for heating the interior of the vehicle using the coolant of the engine 110. Such a vehicle can further include a transmission oil cooling-heating system for cooling or heating oil of a gear box 161 including a transmission using the coolant of the engine 110.

The cooling system includes a heater core 120, through which the coolant absorbing the heat from the engine 110 (e.g., water jacket of an engine block), i.e., the coolant which cools the engine 110, passes to exchange heat with the air that is to be supplied to the interior of the vehicle. Typically the vehicle's interior heating system includes one or more ducts that are fluidly coupled to the heater core 120 and a fan or other device for moving the air past or through the heater core and thence through the duct work so as to supplying heat to the interior of the vehicle. That is, such a hybrid vehicle uses the engine 110 as a heat source, and the heater core 120 to supply heat to the interior of the vehicle through the heat exchange between the coolant passing through the engine 110 and the air to be supplied to the interior of the vehicle.

Such a hybrid vehicle also further includes a radiator 130 and a heat exchanger 140. As is known to those skilled in the art, the un-useable or excess heat energy being generated by the engine 110 needs to be dispelled, dispensed or got rid of for safe continued operation of the engine. Thus, such a hybrid vehicle includes a radiator 130 which is fluidly coupled to the engine so as to radiate the heat or excess heat of the engine 110. In other words, the coolant passing through the engine 110 also passes through the radiator 130 so that through the heat exchange occurring in the radiator between the coolant and the outside air, the excess heat energy is communicated to the outside air or atmosphere.

The heat exchanger 140 is fluidly coupled to another heat source of the vehicle and to the coolant so that the heat energy being generated by the other heat source is dispensed or utilized. In more particular embodiments, the another heat source is fluidly coupled to the cooling system so that the generated heat energy is communicated to the cooling system.

In more particular aspects/embodiments of the present invention the heat exchanger 140 is coupled to the gear box 161, As a consequence of the heat exchange in the heat exchanger 140 between the working oil of the gear box 61 and the coolant such heat exchange is usable to heat or cool the gear box 61 (such as a transmission). As indicated herein, such a gear box 161 or transmission is connected to drive motor 162. In further embodiments. such a driver motor is an electric motor to drive the vehicle or supply additional power to the vehicle or the drive motor is an electric motor/generator that can drive the vehicle or supply additional power to the vehicle when it is functioning as a motor or to generate electric power when configured as a generator.

In further embodiments, such a hybrid vehicle includes a coolant line 151 that is connected between the engine 110, the heater core 120, the heat exchanger 140, and the radiator 130 such that the coolant is circulated there through and a coolant pump 150 that circulates the coolant through the coolant line 151 and the functionalities connected thereto. Also included in the cooling system is a thermostat 152 which controls the flow of the coolant to selectively pass through the radiator 130. The vehicle also includes an oil line 41 or heat exchange medium line that is connected between the heat exchanger 140 and the gear box 161 for circulation of the oil or heat exchange medium there between.

In more particular embodiments, an electric water pump or other pump as is known to those skilled in the art and otherwise appropriate for the intended use is used as the coolant pump 150 to circulate the coolant. More particularly, the coolant pump 150 is configured such that it continues to circulate the coolant even after the engine 10 is stopped or in the off state.

In alternative embodiments, an automatic transmission fluid (AT) warmer for heating the oil of the gear box 161 using the coolant is usable as the heat exchanger 40 in which the heat exchange between the oil and coolant is performed, instead of a heat exchanger 140 as is known to those skilled in that art that is appropriate for cooling the oil of a drive component, i.e., the oil of the gear box 161.

Typically, the AT warmer, which uses the coolant as a heat exchange medium, is used in such a manner that the coolant and oil of an automatic transmission pass through the AT warmer to rapidly increase the temperature of the oil using the coolant, thereby improving the power transmission efficiency of the automatic transmission.

As the AT warmer serves to cool the oil of the automatic transmission using the coolant, the heat exchanger 140 such as the AT warmer, is used in the present invention such that the coolant is heated by the heat exchange between the oil and coolant and the coolant passing through the heat exchanger 140. This heated coolant is supplied to the heater coil 120, thereby supplying heat to the interior of the vehicle.

That is, the coolant heated by the heat exchanger 140 passes through the heater core 120 to heat the air through the heat exchange between the coolant and air, and the heated air is supplied to the interior of the vehicle.

In yet further embodiments, an exhaust heat recovery device, in which heat exchange between the exhaust gas discharged from the engine 10, the coolant, and the oil is performed, is usable as the heat exchanger 140. That is, the exhaust heat recovery device is configured such that the exhaust heat emitted from the exhaust gas is recovered to the coolant and oil. Therefore, the exhaust heat recovery device can be efficiently used in such a manner that the coolant heated by the exhaust heat is used to heat the interior of the vehicle and the oil heated by the exhaust heat is used to heat the automatic transmission.

The exhaust heat recovery device increases the temperature of the coolant using the exhaust gas discharged from the engine 110 during operation, and the heated coolant is supplied to the heater core 120 to be heat-exchanged with air, thereby heating the interior of the vehicle.

When the engine 110 is stopped, the coolant is heated by the oil in a manner described later, and the heated coolant is supplied to the heater core 120 to be heat-exchanged with air, thereby heating the interior of the vehicle.

The thermal management system 100a of the present invention is configurable in such a manner that the coolant for cooling the engine 110 and the heat exchange medium for cooling the drive component (e.g., the gear box) pass through a single heat exchanger 140 for the heat exchange and the heat exchange media is circulated by a single pump, i.e., the coolant pump 150. That is, the heat exchange media (coolant and oil) passing through the heat exchanger 140 can be circulated only by the coolant pump 150 for circulating the coolant.

In the foregoing discussion, as the drive component is defined as the gear box 161 including the transmission, the description has been given to the example in which the heat exchange medium for cooling the drive component is oil. However, if the drive component is cooled by a water cooling system, the medium may be water. Otherwise, if the drive component is cooled by an air cooling system, the medium may be air. In any event Besides, another typical heat exchange medium, which absorbs heat from the drive component, may be used to cool the drive component.

The coolant line 151 is branched between the engine 110 and the coolant pump 150 such that one of the branched lines is connected to a coolant inlet of the engine 110 and the other is connected to an inlet of the heat exchanger 140. In addition, the coolant line 151 is connected to an outlet of the heat exchanger 140 is joined with the coolant line 151 connected to a coolant outlet of the engine 110 and is then connected to an inlet of the heater core 120. Therefore, when the coolant pump 150 is in operation, a portion of the coolant is passed through the heat exchanger 140 and then supplied to the heater core 120, and the rest of the coolant is passed through the engine 110 and then supplied to the heater core 120.

As indicated herein, the thermal management system of the present invention includes a bypass valve 153 that is installed or located in a portion of the coolant line 151 at the coolant inlet of the engine 110 (FIG. 2A) or is installed or located in a portion of the coolant line 151 at the outlet of the engine 110 (FIG. 2B). The bypass valve is operable based on the on/off state of the engine so as to be selectively opened or closed. When closed the bypass valve blocks the flow of coolant to or from the engine such that the coolant passes through only the heat exchanger 140, and not through the engine 110.

In a particular embodiment, the bypass valve 153 is, an electronic valve as is known to those skilled in the art, which is selectively opened and closed in response to a control signal. The bypass valve 153 can be any of a number of valves known to those skilled in the art such as electro-mechanical valves and solenoid valves that is otherwise appropriate for the intended use and type of vehicle. In particular embodiments, the bypass valve 153 is controlled by a controller 170 that outputs a signal that controls the opening and closing operation of the bypass valve 153 according to the on/off state of the engine 110. For example, the controller 170 is a sensor that monitors the operational status of the engine 110. Alternatively, the controller 170 is an engine control unit that controls engine operation and which outputs signals representative of the starting or stopping of the engine.

Operation of the thermal management system and related methods of the present invention can be best understood based on the following discussion with reference to the discussion of FIGS. 2A,B. As shown in FIG. 3, when the engine 10 is driven or in operation (i.e., in the on state), the controller 170 causes the bypass valve 153 to open so the coolant is circulated through the engine 110 to cool the engine 110 and absorb the heat or excess heat being generated by the engine 110. The excess heat is the heat being generated that is not usable in the generation of mechanical power by the engine. The coolant heated by the engine is then supplied to the heater core 120 (e.g., circulated to the heat core by action of the coolant pump 150).

The heat exchange between the coolant and air is performed in the heater core 120 to heat the air, and the heated air is supplied to the interior of the vehicle, thereby heating the interior of the vehicle. That is, the heat of the engine 110 is used to heat the interior of the vehicle. At this time, a portion of the coolant is also supplied to the heat exchanger 140 through a coolant line 151a that is branched for the heat exchange with the oil.

When the engine 10 is stopped or in the off state as shown in FIG. 4, for example, when the vehicle is being driven only by the drive motor 162 such as in an electric vehicle (EV) mode, the controller causes the bypass valve 153 to close such that the coolant does not pass through the engine 110, but is bypassed by the engine so that the coolant is not thereby cooled by the cooling engine.

In this case, the coolant is heated by the heat exchange with the oil in the heat exchanger 140 and the heated coolant is supplied to the heater core 120 for the heating of the interior of the vehicle. Thus, the coolant does not pass through the engine 110 but is supplied to the heater core 120 through the heat exchanger 140. Therefore, the heat of the coolant is not transferred to the engine 110 even when the stopped engine 110 cools down, thereby improving the heating performance.

That is, the coolant is bypassed so as not to pass through the engine 110 such that the coolant is not cooled by the cold or cooling engine 110. Therefore, it is possible to increase the temperature of the coolant compared to the case where the coolant is passing through the engine 110 at all times, even when stopped like the conventional system. As a consequence the amount of heat emitted the heater core 120 to the air is thereby increased.

When the temperature of the engine 110 needs to be increased, the bypass valve 153 is opened such that the coolant passes through the engine 110. At this time, the coolant heated by the heat exchanger 140 passes through the engine 110.

As described above, according to the thermal management system for the hybrid vehicle of the present invention, when the engine is stopped or in the off state, for example, when the vehicle is driven in the EV mode, the bypass valve is operated such that the coolant is bypassed through the engine and passes through only the heat exchanger and the heater core. As a result, it is possible to prevent the temperature of the coolant used to heat the interior of the vehicle from being reduced by the cold engine 110, thereby further improving the heating performance during the engine stop.

The invention has been described in detail with reference to preferred embodiments thereof such description is for illustrative purposes only. However, it will be appreciated by those skilled in the art that changes may be made in these embodiments without departing from the principles and spirit or scope of the invention, the scope of which is defined in the appended claims and their equivalents.

INCORPORATION BY REFERENCE

All patents, published patent applications and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A thermal management system for a hybrid electric vehicle, comprising:
   a heater core that supplies heat for heating the interior of a vehicle by heat exchange between a coolant passing through an engine and air to be supplied to the interior of the vehicle;
   a heat exchanger in which heat exchange between a heat exchange medium passing through a drive component and the coolant is performed;
   a coolant line for allowing the coolant to pass through the engine, the heater core, and the heat exchanger;
   a coolant pump installed in the coolant line;
   a heat exchange medium line for allowing the heat exchange medium to be circulated through the heat exchanger and the drive component; and
   a bypass valve installed in the coolant line at a coolant inlet or a coolant outlet of the engine, the bypass valve being selectively opened and closed by a controller according to the on/off state of the engine,
   wherein the coolant line is branched into two branched lines between the engine and the coolant pump such that one of the branched lines is connected to the coolant inlet of the engine and the other is connected to an inlet of the heat exchanger, and the coolant line connected to an outlet of the heat exchanger is joined with the coolant line connected to the coolant outlet of the engine and is connected to an inlet of the heater core, and
   wherein the bypass valve is controlled such that the coolant does not pass through the engine but passes through only the heat exchanger when the engine is stopped and the coolant heated by the heat exchanger and to be supplied to the heater core to heat the interior of the vehicle is prevented from being cooled by the engine.

2. The system of claim 1, wherein the heat exchanger is an automatic transmission oil warmer in which heat exchange between an automatic transmission oil as a heat exchange medium and the coolant is performed.

3. The system of claim 1, wherein the heat exchanger is an exhaust heat recovery device in which heat exchange between exhaust gas discharged from the engine, the coolant, and the oil as the heat exchange medium is performed.

4. The system of claim 1, wherein the heat exchange medium of the heat exchanger is circulated only by the coolant pump for circulating the coolant.

5. A thermal management method for a thermal management system for hybrid vehicle, the thermal management system including a heater core for supplying heat required to heat the interior of the vehicle by heat exchange between a coolant passing through an engine and air to be supplied to the interior of the vehicle, a heat exchanger in which heat exchange between a heat exchange medium passing through a drive component and the coolant is performed, a coolant line for allowing the coolant to pass through the engine, the heater core, and the heat exchanger, a coolant pump installed in the coolant line, a heat exchange medium line for allowing the heat exchange medium to be circulated through the heat exchanger and the drive component, and a bypass valve installed in the coolant line at a coolant inlet or a coolant outlet of the engine to be opened and closed by a controller such that the coolant selectively passes through the engine, said thermal management method comprising the step(s) of:
   controlling the bypass valve so that the coolant does not pass through the engine but passes through only the heat exchanger when the engine is stopped and so the coolant heated by the heat exchanger and to be supplied to the heater core to heat the interior of the vehicle is prevented from being cooled by the engine,
   wherein the coolant line is branched into two branched lines between the engine and the coolant pump such that one of the branched lines is connected to the coolant inlet of the engine and the other is connected to an inlet of the heat exchanger, and the coolant line connected to an outlet of the heat exchanger is joined with the coolant line connected to the coolant outlet of the engine and is connected to an inlet of the heater core.

6. The method of claim 5, wherein the heat exchanger is an automatic transmission oil warmer in which heat exchange between an automatic transmission oil as a heat exchange medium and the coolant is performed.

7. The method of claim 5, wherein the heat exchanger is an exhaust heat recovery device in which heat exchange between exhaust gas discharged from the engine, the coolant, and the oil as the heat exchange medium is performed.

8. The method of claim 5, wherein the heat exchange medium of the heat exchanger is circulated only by the coolant pump for circulating the coolant.

9. A thermal management system for a vehicle having an engine, comprising:
   a heater core that supplies heat for heating the interior of a vehicle by heat exchange between a coolant passing through the engine and air to be supplied to the interior of the vehicle;
   a coolant line fluidly coupled to the engine and the heater core so that the coolant passes there through;
   a coolant pump installed in the coolant line to circulate the coolant;
   a bypass valve installed in the coolant line directly between a coolant of the engine and a branched portion of the coolant line connected to the heat exchanger inlet or directly between a coolant outlet of the engine and an inlet of the heater core;
   a controller operably coupled to the bypass valve; and
   wherein the controller is configured so as to selectively open and close the bypass valve according to the on/off state of the engine, where the controller controls the bypass valve such that the coolant does not pass through the engine but passes through only the heater core and thus prevented from being cooled by the engine, wherein the coolant line is branched into two branched lines between the engine and the coolant pump such that one of the branched lines is connected to the coolant inlet of the engine and the other is connected to an inlet of the heat exchanger, and the coolant line connected to an outlet of the heat exchanger is joined with the coolant line connected to the coolant outlet of the engine and is connected to an inlet of the heater core.

10. The thermal management system of claim 9, further comprising:
   a heat exchanger that is fluidly coupled to a heat source of the vehicle so that heat is exchanged by a heat exchange medium passing there between;
   wherein the coolant line is fluidly coupled to the engine, the heater core, and the heat exchanger so that coolant passes there through; and
   wherein when the bypass valve is controlled such that the coolant does not pass through the engine when it is stopped, the coolant passes through the heat exchanger so the coolant is heated by the heat exchanger and supplied to the heater core to heat the interior of the vehicle.

11. The thermal management system of claim 10, wherein the heat exchanger is an automatic transmission oil warmer in which heat exchange between an automatic transmission oil as a heat exchange medium and the coolant is performed.

12. The thermal management system of claim 10, wherein the heat exchanger is an exhaust heat recovery device in which heat exchange between exhaust gas discharged from the engine, the coolant, and the oil as the heat exchange medium is performed.

13. The thermal management system of claim 9, wherein the vehicle is a hybrid electric vehicle.

14. A hybrid electric vehicle comprising:
   a reciprocating engine;
   a drive component selectively operably coupled to the engine;
   a thermal management system that controls at least heating of an interior of the vehicle, said thermal management system comprising:
   a heater core that supplies heat for heating the interior of a vehicle by heat exchange between a coolant passing through the engine and air to be supplied to the interior of the vehicle;
   a coolant line fluidly coupled to the engine and the heater core so that the coolant passes there through;
   a coolant pump installed in the coolant line to circulate the coolant;
   a bypass valve installed in the coolant line directly between a coolant of the engine and a branched portion of the coolant line connected to the heat exchanger inlet or directly between a coolant outlet of the engine and an inlet of the heater core;
   a controller operably coupled to the bypass valve; and
   wherein the controller is configured so as to selectively open and close the bypass valve according to the on/off state of the engine, where the controller controls the bypass valve such that the coolant does not pass through the engine but passes through only the heater core and thus prevented from being cooled by the engine,
   wherein the coolant line is branched into two branched lines between the engine and the coolant pump such that one of the branched lines is connected to the coolant inlet of the engine and the other is connected to an inlet of the heat exchanger, and the coolant line connected to an outlet of the heat exchanger is joined with the coolant line connected to the coolant outlet of the engine and is connected to an inlet of the heater core.

15. The hybrid electric vehicle of claim 14, wherein the thermal management system further includes:
   a heat exchanger that is fluidly coupled to a heat source of the vehicle so that heat is exchanged by a heat exchange medium passing there between;
   wherein the coolant line is fluidly coupled to the engine, the heater core, and the heat exchanger so that coolant passes there through; and
   wherein when the bypass valve is controlled such that the coolant does not pass through the engine when it is stopped, the coolant passes through the heat exchanger and the heater core so the coolant is heated by the heat exchanger and supplied to the heater core to heat the interior of the vehicle.

16. A thermal management method for a vehicle, comprising the step(s) of: providing a thermal management system including a heater core that supplies heat for heating the interior of a vehicle by heat exchange between a coolant passing through an engine and air to be supplied to the interior of the vehicle, a coolant line fluidly coupled to the engine and the heater core so that the coolant passes there through, a coolant pump installed in the coolant line to circulate the coolant, and a bypass valve installed in the coolant line in proximity to the engine; and controlling the bypass valve so that the coolant does not pass through the engine and so that the coolant passes through at least only the heater core and thus prevented from being cooled by the engine, wherein the coolant line is branched into two branched lines between the engine and the coolant pump such that one of the branched lines is connected to the coolant inlet of the engine and the other is connected to an inlet of the heat exchanger, and the coolant line connected to an outlet of the heat exchanger is joined with the coolant line connected to the coolant outlet of the engine and is connected to an inlet of the heater core.

17. The thermal management method of claim 16, wherein:
   said provided thermal management system further includes a heat exchanger that is fluidly coupled to a heat source of the vehicle so that heat is exchanged by a heat exchange medium passing there between, where the coolant line is fluidly coupled to the engine, the heater core, and the heat exchanger so that coolant passes there through; and
   said controlling the bypass valve includes controlling the bypass valve such that the coolant does not pass through the engine when it is stopped, and such that the coolant passes through the heat exchanger and the heater core so the coolant is heated by the heat exchanger and supplied to the heater core to heat the interior of the vehicle.

18. The thermal management method of claim 16, wherein the vehicle is a hybrid electric vehicle.

* * * * *